(12) United States Patent
Bruck et al.

(10) Patent No.: US 9,057,271 B2
(45) Date of Patent: Jun. 16, 2015

(54) SPLICE INSERT REPAIR FOR SUPERALLOY TURBINE BLADES

(75) Inventors: Gerald J. Bruck, Oviedo, FL (US); Brandon W. Shinn, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 657 days.

(21) Appl. No.: 13/357,692

(22) Filed: Jan. 25, 2012

(65) Prior Publication Data

US 2013/0115091 A1 May 9, 2013

Related U.S. Application Data

(60) Provisional application No. 61/555,499, filed on Nov. 4, 2011.

(51) Int. Cl.
| | |
|---|---|
| *F01D 5/00* | (2006.01) |
| *B23K 1/00* | (2006.01) |
| *B23P 6/00* | (2006.01) |

(52) U.S. Cl.
CPC ........... *F01D 5/005* (2013.01); *Y10T 29/49318* (2015.01); *B23P 6/005* (2013.01); *B23K 1/0018* (2013.01); *F05D 2230/80* (2013.01)

(58) Field of Classification Search
CPC ....... B23K 1/0018; B23P 6/005; F01D 5/005; F01D 5/20; F05D 2230/80
USPC ............ 416/1, 96 A, 96 R, 97 R, 223 R, 224, 416/229 A, 232, 233, 241 R; 29/889.1, 889.7
See application file for complete search history.

(56) References Cited

U.S. PATENT DOCUMENTS

| | | | | |
|---|---|---|---|---|
| 4,073,599 | A * | 2/1978 | Allen et al. | 416/97 R |
| 4,589,824 | A * | 5/1986 | Kozlin | 416/97 R |
| 5,269,057 | A * | 12/1993 | Mendham | 29/889.1 |
| 6,199,746 | B1 * | 3/2001 | Dupree et al. | 228/119 |
| 6,332,272 | B1 * | 12/2001 | Sinnott et al. | 29/889.1 |
| 6,413,041 | B1 * | 7/2002 | Sedillo | 415/115 |
| 6,413,650 | B1 * | 7/2002 | Dupree et al. | 428/579 |
| 6,454,156 | B1 * | 9/2002 | Taras et al. | 228/165 |
| 7,591,070 | B2 * | 9/2009 | Lee | 29/889.1 |
| 8,721,284 | B2 * | 5/2014 | Balliel et al. | 416/96 R |
| 2003/0034379 | A1 * | 2/2003 | Jackson et al. | 228/119 |
| 2003/0082048 | A1 | 5/2003 | Jackson et al. | |
| 2005/0102835 | A1 * | 5/2005 | Trewiler et al. | 29/889.1 |

(Continued)

FOREIGN PATENT DOCUMENTS

| | | |
|---|---|---|
| GB | 2071777 A | 9/1981 |
| JP | 09168927 A | 6/1997 |

(Continued)

*Primary Examiner* — Richard Edgar

(57) ABSTRACT

A damaged portion of a superalloy material turbine blade body is removed, forming an excavated recess. A repair splice is formed of a same material with similar mechanical structural properties, having a mating outer profile conforming to the corresponding recess profile. The repair splice is inserted and captured within the recess, so that the blade body and repair splice are mechanically interlocked. Given similarities in mechanical properties of both the blade body and the mechanically interlocked splice the repaired blade's overall mechanical structural properties are similar to those of an undamaged blade. The repair splice is affixed to the blade body so that the interlocking respective portions of each do not separate. Localized affixation and subsequent cosmetic blade surface repair can be performed with softer, low temperature application braze and weld alloys.

17 Claims, 11 Drawing Sheets

(56) References Cited

U.S. PATENT DOCUMENTS

2009/0049689 A1* 2/2009 Hiskes .................. 29/889.1
2012/0082564 A1* 4/2012 Ellis et al. .................. 416/97 R

FOREIGN PATENT DOCUMENTS

| JP | 2004084604 A | 3/2004 |
| JP | 2009041449 A | 2/2009 |

* cited by examiner

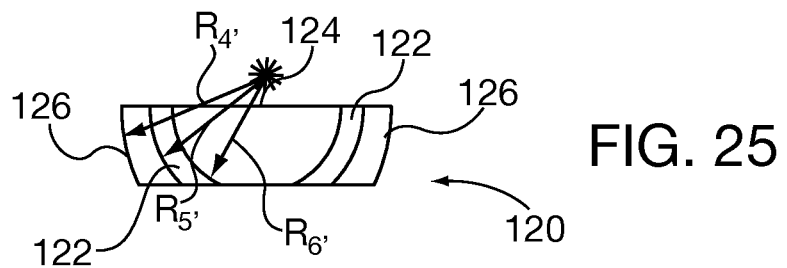
FIG. 25
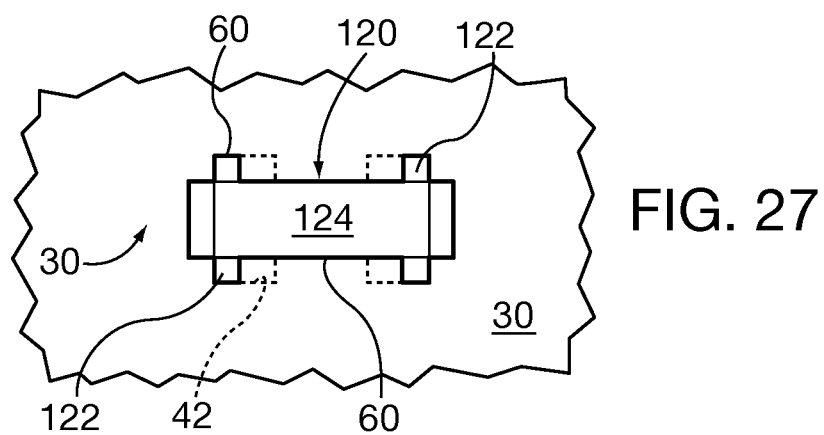
FIG. 26
FIG. 27

SPLICE INSERT REPAIR FOR SUPERALLOY TURBINE BLADES

CLAIM TO PRIORITY

This application claims the benefit of U.S. provisional patent application entitled "Mechanical Engagement to Enable Structural Repair of Advanced Superalloys" filed Nov. 4, 2011 and assigned Ser. No. 61/555,499, which is incorporated by reference in its entirety herein.

BACKGROUND OF THE DISCLOSURE

1. Field of the Invention

The invention relates to mechanical structural repair of advanced superalloy components, and more particularly to mechanical structural repair of superalloy material turbine blade castings of the type used in gas turbines, by use of splice inserts, in a manner that does not significantly reduce mechanical structural or material properties of the repaired blade.

2. Description of the Prior Art

"Structural" repair of gas turbine superalloy components is commonly recognized as replacing damaged material with matching alloy material and achieving properties such as strength that are close to the original manufacture component specifications (e.g., seventy percent ultimate tensile strength of the original specification). In comparison, "cosmetic" repair of such alloys is recognized as replacing damaged material with unmatching alloy material of lesser structural property specifications, where the localized original structural performance is not needed, in order to restore the repaired component's original profile geometry. An example of cosmetic repair is for filling surface pits on a turbine blade airfoil in order to restore its original aerodynamic profile, where the blade's localized exterior surface is not critical for structural integrity of the entire blade. Cosmetic repair is often achieved by using oxidation resistant weld or braze alloys of lower strength than the blade body superalloy substrate, but having higher ductility and lower temperature application that does not negatively impact the superalloy substrate's material properties.

Structural repair of nickel and cobalt based superalloy material that is used to manufacture turbine components, such as cast turbine blades, is challenging, due to the metallurgic properties of the finished blade material. The finished turbine blade alloys are typically strengthened during post casting heat treatments which render them difficult to perform subsequent structural welding. For example, when a superalloy, such as CM247, is welded with rods of the same or similar alloy, the blade is susceptible to strain age cracking within proximity to the weld. Often the only solution is to scrap damaged turbine blades that require structural repair, because past experience has shown limited success of such structural repairs. Thus repairs have been limited to those that have in the past been proven to be performed successfully by cosmetic welding, employing more ductile welding rod filler materials with reduced structural strength.

SUMMARY OF THE INVENTION

Accordingly, an object of the invention is to perform structural repairs of superalloy turbine components, such as turbine blades, including cast turbine blades with hollow interior portions.

Another object of the present invention is to increase the likelihood of performing successful structural repair of superalloy turbine components, such as turbine blades, including cast turbine blades with hollow interior portions, so that damaged blade scrap rates can be reduced.

Another object of the present invention is to perform structural repairs of superalloy turbine components, such as turbine blades, including cast turbine blades with hollow interior portions, with proven, repeatable repair techniques and machinery, that do not require complex welding or post-repair heat treatment procedures.

These and other objects are achieved in accordance with the present invention by a method for repairing a superalloy material turbine blade body by replacing the damaged portion with a mechanically interlocking repair splice. The mechanical interlocking repair splice restores the repaired blade's structural properties without risking additional repair damage inherent in known weld repair methods. In the present repair method, the damage is removed, forming an excavated recess. A repair splice is formed of a same material with similar mechanical structural properties, having a mating outer profile conforming to the corresponding recess profile. The repair splice is inserted and captured within the recess, so that the blade body and repair splice are mechanically interlocked. Given similarities in mechanical properties of both the blade body and the mechanically interlocked splice the repaired blade's overall mechanical structural properties are similar to those of an undamaged blade. The repair splice is affixed to the blade body so that the interlocking respective portions of each do not separate. Localized affixation and subsequent cosmetic blade surface repair can be performed with softer, low temperature application braze and weld alloys that do not create additional significant risk of blade damage.

The present invention features a method for repairing a turbine blade by removing a damaged portion of a body of a turbine blade and forming an excavated recess therein whose profile is defined by the blade body. A repair splice having a mating outer profile corresponding to the recess profile is formed. The repair splice is inserted and captured within the excavated recess, resulting in a unified, mechanically interlocked repaired blade. The repair splice is affixed to the blade body in order to prevent their separation.

The present invention also features a method for repairing a turbine blade end cap by removing a damaged portion of a turbine blade end cap and forming an excavated recess whose profile is defined by the remaining undamaged end cap and blade body. An end cap repair splice is formed, having a mating outer profile corresponding to the recess profile, wherein repair splice is constructed of a same material as the blade body with substantially similar mechanical structural properties. The repair splice is inserted and captured within the recess, so that the remaining, undamaged end cap and blade body and end cap repair splice are mechanically interlocked. The end cap repair splice is affixed to the undamaged end cap and blade body, in order to prevent their separation. Affixation is performed by heat application of alloys selected from the group consisting of brazing alloys and weld alloys that upon their application do not substantially change the blade and repair splice structural properties. Additionally, separation gaps between the mating blade body surfaces defining the recess and the repair splice are cosmetically filled with low temperature brazing or welding alloys.

The present invention additionally features a repaired turbine blade that has a blade body with an excavated recess and a mating, mechanically interlocking repair splice inserted and captured within the recess, with the repair splice affixed to the blade body for retention thereof.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 25 is an elevational view of the splice embodiment of FIG. 24;

FIG. 26 is a partial cross-sectional elevational view of the repair splice being rotatively inserted into the mating recess of FIG. 22; and FIG. 27 is a plan view of a completed turbine port of the embodiment of FIGS. 22-27.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized for mechanical structural repair of advanced superalloy components, and more particularly to mechanical structural repair of superalloy material turbine blade castings of the type used in gas turbines, by use of splice inserts, in a manner that does not significantly reduce mechanical structural or material properties of the repaired blade. The mechanical interlocking repair splice restores the repaired blade's structural properties without risking additional repair damage inherent in known weld repair methods. In the present repair method, the damage is removed, forming an excavated recess. A repair splice is formed of a same material with similar mechanical structural properties, having a mating outer profile conforming to the corresponding recess profile. The repair splice is inserted and captured within the recess, so that the blade body and repair splice are mechanically interlocked. Given similarities in mechanical properties of both the blade body and the mechanically interlocked splice the repaired blade's overall mechanical structural properties are similar to those of an undamaged blade. The repair methods of the present invention do not require complex welding or heat treatment procedures, using known mechanical cutting and fitting processes, and limited need for only cosmetic brazing or welding needed to retain interlocked splice and excavation recess relationships (i.e., so that the repair splice does not back out of its interlocking, inserted relationship with the recess).

Known Superalloy Component Repair Methods

Figure 1:
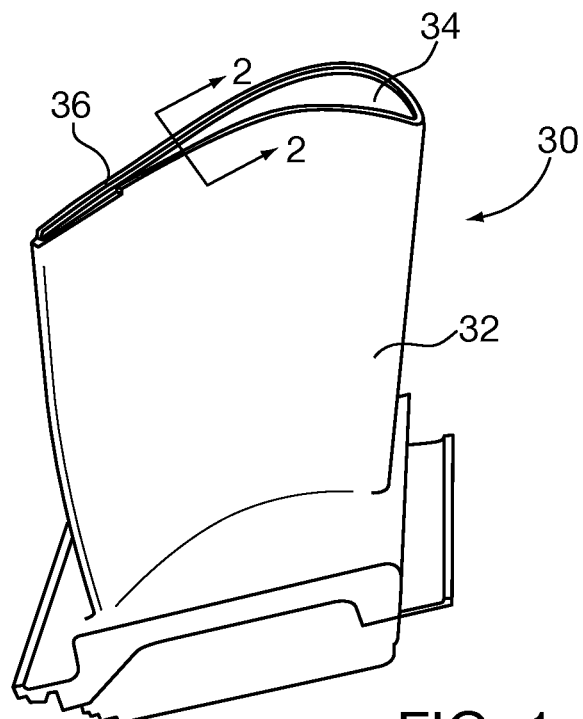
FIG. 1 is an elevational perspective view of a prior art turbine blade.
Figure 2:
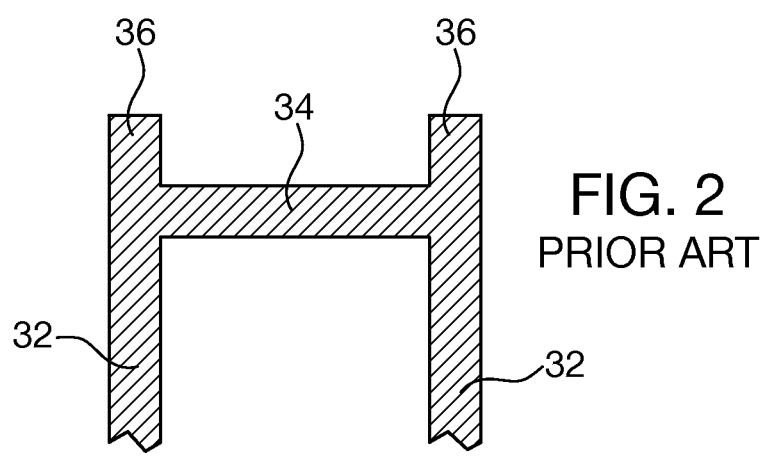
FIG. 2 is a schematic elevational sectional view of the turbine blade of FIG. 1, taken along 2-2.
Figure 3:
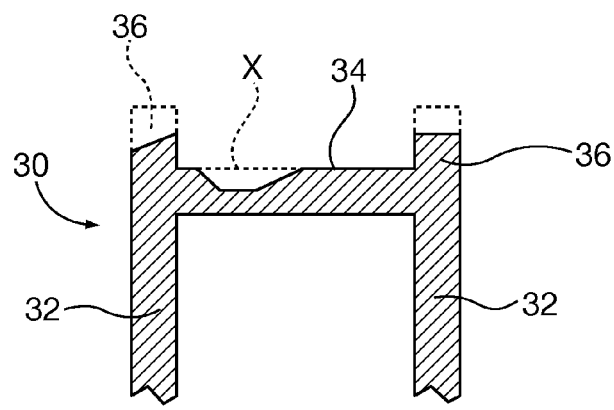
FIG. 3 is a schematic elevational sectional view of an exemplary damaged turbine blade of the type in FIG. 2.

Prior art methods for repair of an exemplary cast, hollow turbine blade constructed of cast directionally solidified gamma prime strengthened, nickel based superalloy 247 is shown in FIGS. 1-5. A new and undamaged turbine blade 30 is shown in FIGS. 1 and 2, having blade sides 32, a tip cap 34 and a so-called "squealer" radially projecting ridge 36 around the blade tip top edge. A typical damaged tip cap 34 that has degraded in operational service is shown in FIG. 3, with the exemplary damaged portion X shown in phantom. Damaged portions of the squealer 36 are also shown in phantom.

Figure 4:
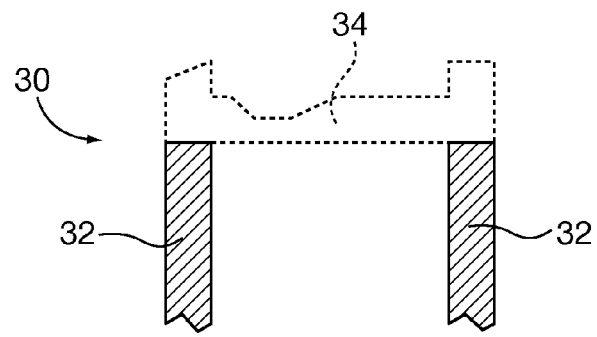
FIG. 4 is a schematic elevational sectional view of the exemplary damaged turbine blade of FIG. 3, showing a first step of a prior art repair method, by removing the entire damaged tip cap.
Figure 5:
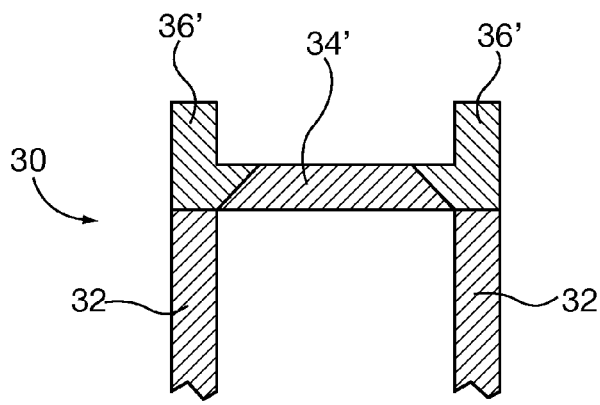
FIG. 5 is a schematic elevational sectional view of the exemplary damaged turbine blade of FIG. 3, showing a subsequent step of a prior art repair method, by welding a new tip cap on the blade.

The known conventional repair process to replace the damaged portion X of the tip cap 34 is shown in FIGS. 4 and 5. The blade end including the entire damaged and undamaged portions of the tip cap 34 and squealer 36 are cut and/or ground away. A new tip cap 34', constructed of the same material as the blade body 32 is cosmetically welded to the blade body with a relatively ductile filler weld rod, such as wrought nickel based alloy 625. Alloy 625 does not have the same strength properties as the original blade body substrate nickel based superalloy 247. The replacement squealer 36' is also constructed from a built-up cosmetic weld bead. Weld beads are subsequently shaped to the desired dimensional profile of a new blade. Cosmetic welding repair of the blade tip 34 and squealer 36 is sometimes tolerable because they are subjected to lower structural stresses than material more proximal the blade root.

Attempts to perform structural-quality weld repair of a new tip cap 34' to the blade body sides 32 generally results in cracking of the weld material or the surrounding superalloy blade sides 32/tip cap 34' in the weld heat application zone. Cracking is most prevalent after post weld heat treatment necessary to restore blade structural properties acceptably approximating new blade specifications (i.e., at least seventy percent original strength). Given likely failure of structurally welded blade repairs, many repair facilities choose to scrap blades requiring structural repair, rather than waste expense of attempting what are likely to be futile repair attempts.

Present Invention Mechanical Structural Repair

Figure 6:
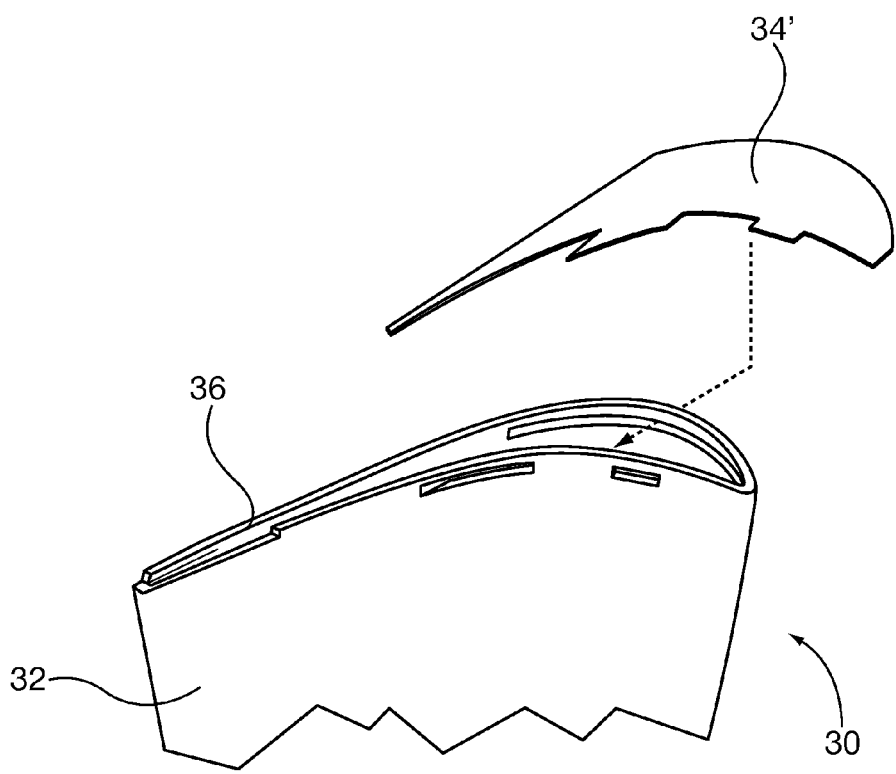
FIG. 6 is an elevational perspective view of an exemplary turbine blade, showing insertion of a repair splice in accordance with an embodiment of the turbine blade repair method of the present invention.
Figure 7:
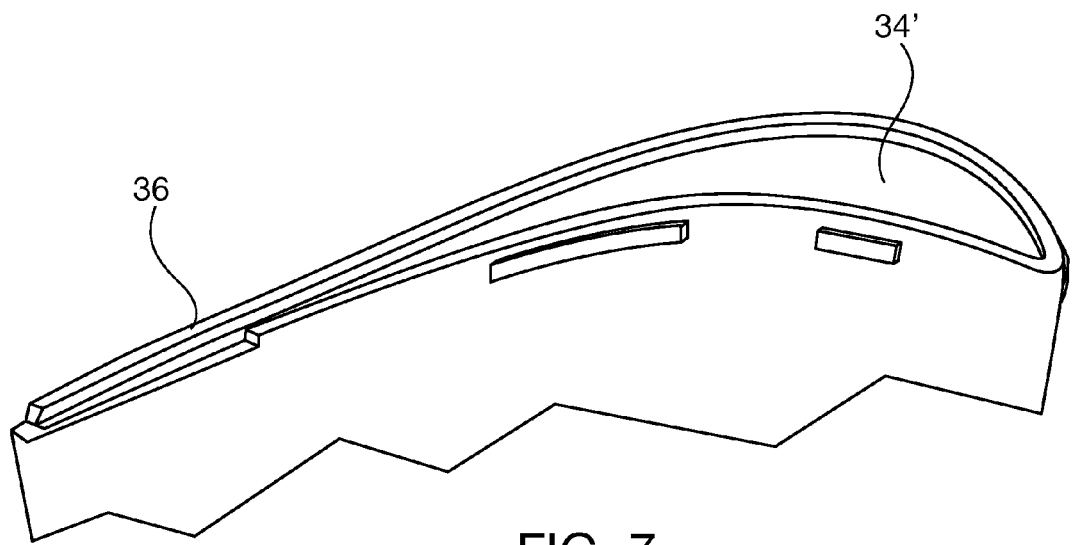
FIG. 7 is an elevational perspective view of the turbine blade of FIG. 6, after insertion and affixation of the repair splice in accordance with an embodiment of the turbine blade repair method of the present invention.

FIGS. 6 and 7 show repair of a typical superalloy turbine blade 30 using methods of the present invention. The tip cap 34 is mechanically removed from the blade 30, such as by electric discharge machining, and excavation recesses are formed in the blade body side walls 32, for one-way receipt of a repair splice 34' that is slidably inserted therein. As shown in FIG. 7, the fully inserted repair splice 34' has a profile that conforms with the excavation recesses, and thus is mechanically interlocked with the excavation recesses formed in the blade side walls 32. Given the mechanically interlocking relationship between the blade side walls 32 and repair splice 34', both of which are constructed the same high strength superalloy material, with the same heat treatment properties, the repaired blade has similar structural and material properties as an original "as new" blade. Orientation of the repair splice 34' insertion and the interlocking geometry can be chosen to optimize mechanical strength of the repaired blade 30. The fully engaged repair spice 34' now forms the repaired blade tip. The repair splice 34' is now affixed to the blade body side walls 32 to prevent it from withdrawing and separating from the fully inserted position mechanically interlocked relationship. As the repair splice 34' affixation strength only needs to prevent withdrawal of the repair splice from interlocking relationship with the blade body 32, cosmetic welding or brazing techniques are sufficient to assure adequate repair splice retention. Here the original squealer 36 was for the most part undamaged, so there was no need to remove that material. Any needed squealer 36 repairs can be accomplished by cosmetic welding, or if desired, they can be constructed within the repair splice 34'. Other cosmetic repairs can be performed, such as grinding or otherwise removing excess repair splice 34' and/or cosmetic weld/braze material that projects from the blade side wall 32 surface. Similarly, surface gaps between the affixed repair splice 34' and blade side wall 32 can be filled by cosmetic brazing or welding, followed by cosmetic surface grinding.

Figure 8:
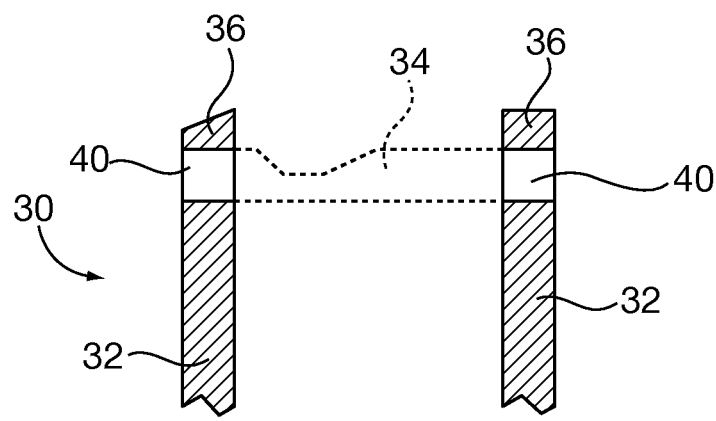
FIG. 8 is a schematic elevational sectional view of an exemplary damaged turbine blade of the type in FIG. 2 showing the present invention repair removal of the damaged tip cap and formation of the excavation recess within adjoining non-damaged blade tip region.
Figure 9:
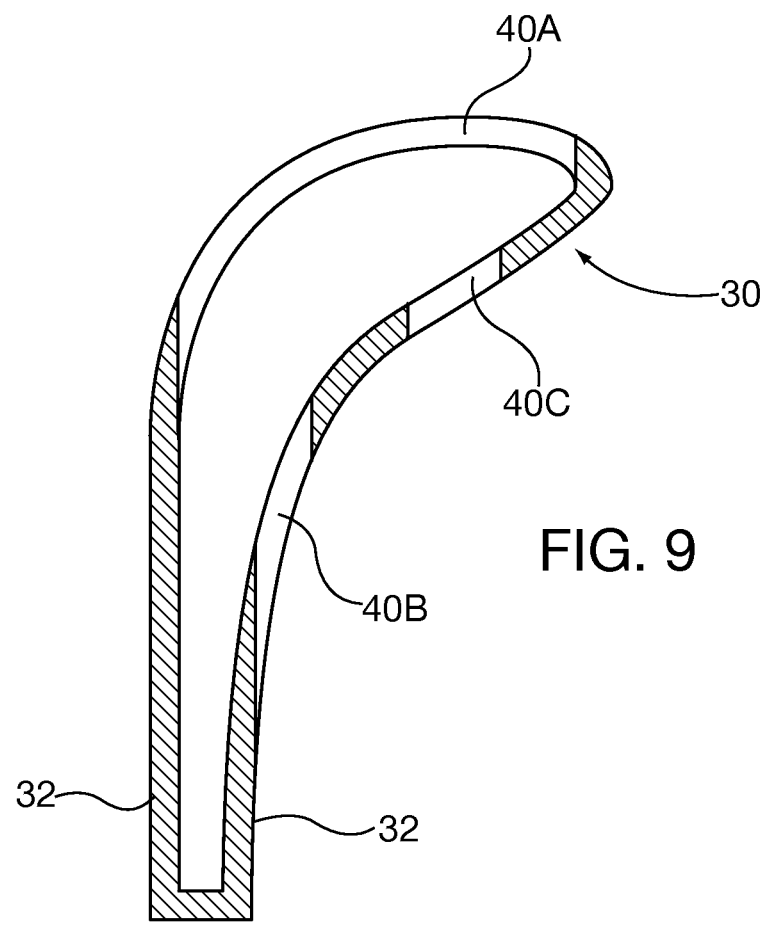
FIG. 9 is a schematic plan view of the turbine blade of FIG. 8, showing the present invention repair through-slot excavation recesses.
Figure 10:
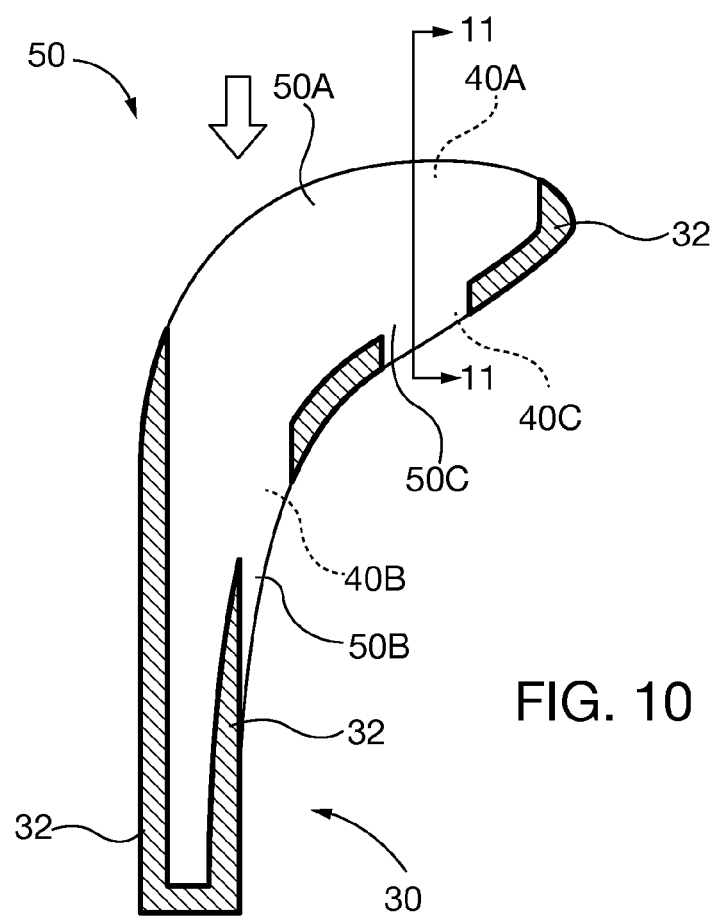
FIG. 10 is a schematic plan view of the turbine blade of FIG. 8, showing the one-way insertion of a repair splice, in accordance with an embodiment of the present invention.
Figure 11:
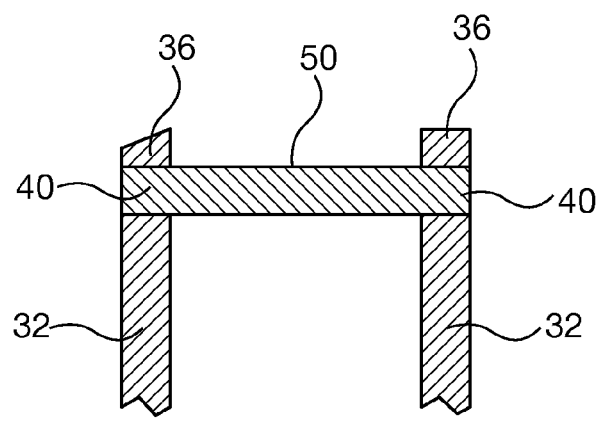
FIG. 11 is a schematic elevational cross-sectional view taken along 11-11 of FIG. 10.
Figure 12:
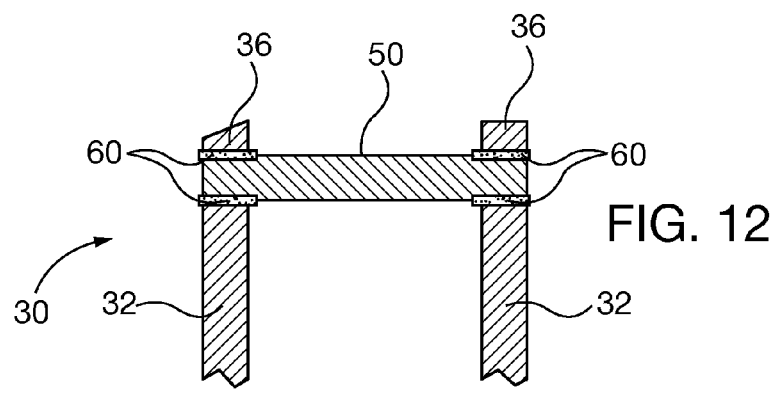
FIG. 12 is a schematic elevational cross-sectional view showing affixation of the inserted repair splice of FIG. 11 in accordance with an embodiment of the present invention, by brazing the repair splice tip cap to the blade body.
Figure 13:
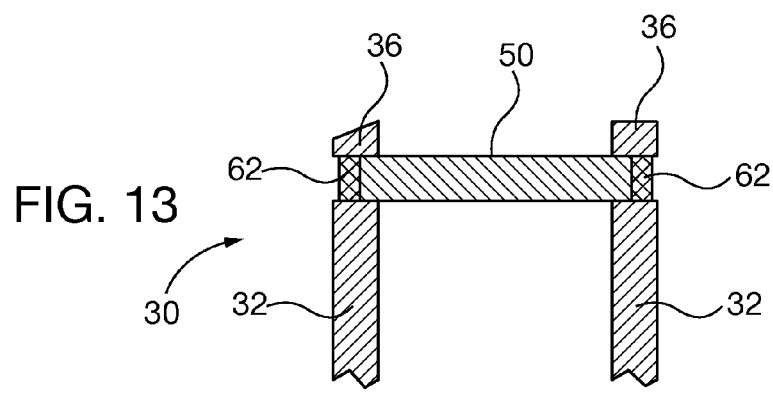
FIG. 13 is a schematic elevational cross-sectional view showing affixation of the inserted repair splice of FIG. 11 in accordance with another embodiment of the present invention, by welding the repair splice tip cap to the blade body.

Exemplary sequential steps for the type repair of the turbine blade 30 of FIGS. 6 and 7 are shown schematically in FIGS. 8-13. In FIG. 8 the damaged end cap 34 is removed, shown in phantom dashed lines. Excavation recesses 40 are formed in side walls 32 of the turbine blade 30 by electric discharge machining or other known cutting methods, so that some of the original material of the blade body substrate remains above the recess. In this way, the splice insert that is ultimately captured within the recess is structurally supported by material having comparable material properties. More specifically, referring to FIGS. 9-11, the excavation recess 40 includes a major through-slot 40A of planar configuration, that is dimensioned to receive the new planar repair splice 50. The recess 40 also has minor through-slots 40B, 40C, that mate with corresponding repair splice projections 50B, 50C. The repair splice 50 and the corresponding excavation recess 40 are configured for one-way insertion through the major through-slot 40A. The repair splice 50 and blade body 30 are mechanically structurally interlocked when the splice projections 50D, 50C are fully seated into their corresponding minor through slots 40B, 40C. This leaves the splice 50 outer periphery 50A engaged within the major through-slot 40A. The repair splice 50 is then affixed to the blade body 30 in the mechanical interlocking, fully seated position, in order to prevent future withdrawal or separation. Affixation strength needs to be sufficient to retain the repair splice 50, but need not be of the same strength as the interlocking superalloy substrates. Cosmetic repair affixation methods are sufficient. In FIG. 12, the tip cap repair splice 50 is retained within the side walls 32 by one or more brazing alloy beads 60. Alternatively, as shown in FIG. 13, the repair splice 50 is affixed to the blade body side walls 32 with plug-welded malleable alloy beads 62. In some affixation applications the splice can be mechanically staked, riveted, pinned or otherwise mechanically fastened to the blade body substrate.

The specific profiles of the planar through-stop recesses 40 and repair splices 50 shown in FIGS. 8-13 are non-limiting examples, and they may be modified to optimize structural strength and/or fabrication ease for any specific application. Any recess and repair splice cross-sectional mating profile, with unitary continuous or locally varying dimensions suitable for the design application may be used. Other excavation recess and splice repair profiles embodiments are shown in FIGS. 14-27.

Figure 14:
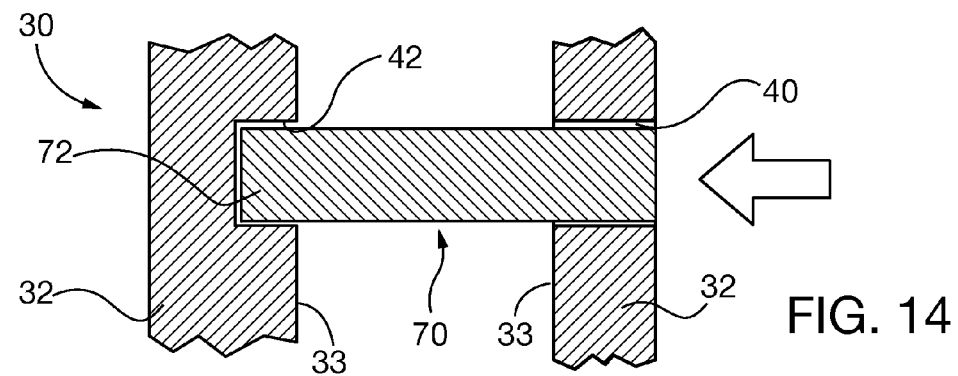
FIG. 14 is an elevational schematic view of a mating, interlocking repair splice within a blind recess excavation in accordance with another embodiment of the present invention.
Figure 15:
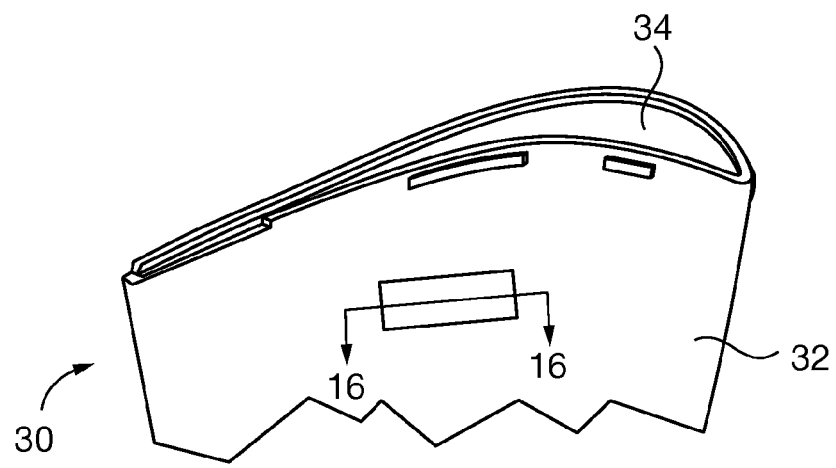
FIG. 15 is an elevational perspective view of a mating, interlocking repair splice within a hollow turbine blade in accordance with another embodiment of the present invention.

In FIG. 14, one or more blind recesses 42 that do not fully penetrate a turbine blade body substrate, such as side wall 32 may be formed, for interlocking retention splice 70 by a complementary mating projection 72. Orientation or recess and mating projection may be reversed so that the side wall substrate forms a male projection and the repair splice includes a female recess.

Figure 16:
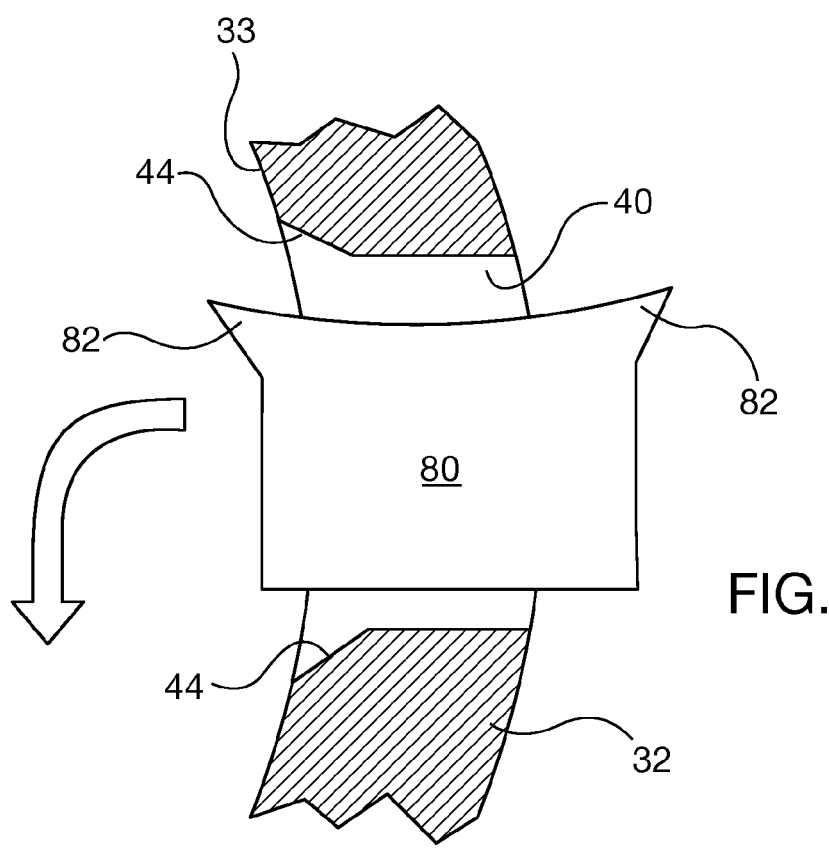
FIG. 16 is a cross-sectional plan view of the turbine blade of FIG. 15, taken along 16-16 thereof showing initial positioning of a repair splice within a hollow portion of the blade, through a recess excavation.
Figure 17:
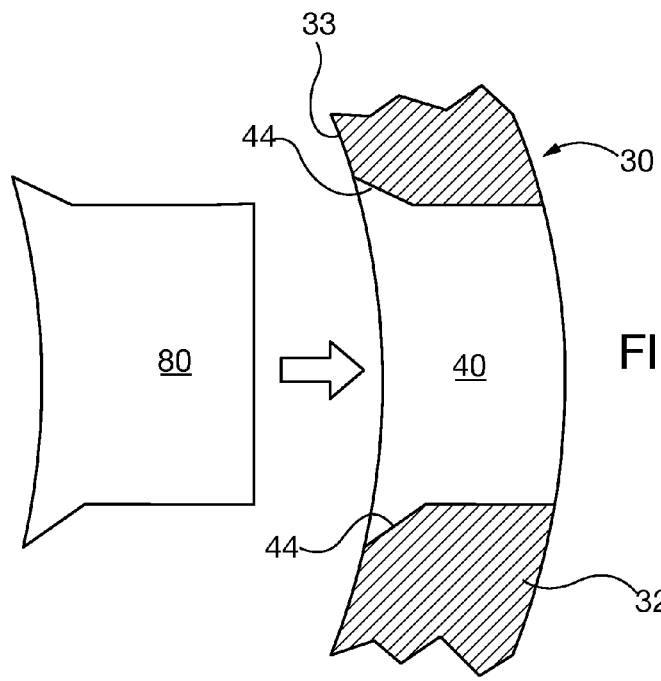
FIG. 17 is a cross-sectional plan view similar to FIG. 16, showing alignment of the repair splice and recess prior to insertion therein.
Figure 18:
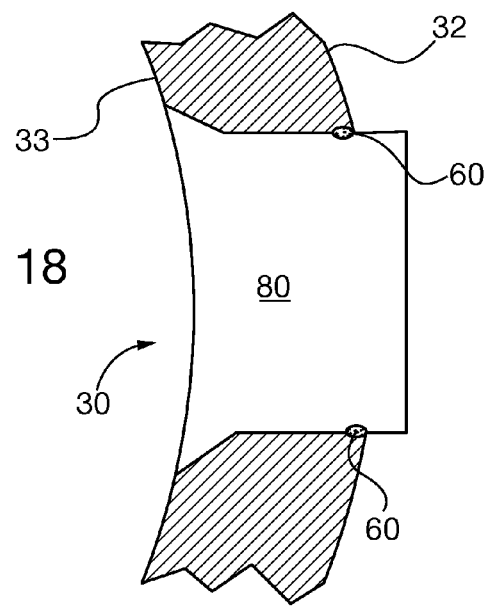
FIG. 18 is a cross-sectional plan view similar to FIGS. 16 and 17, showing post insertion interlocking alignment between the repair splice and recess, ready for affixation.
Figure 19:
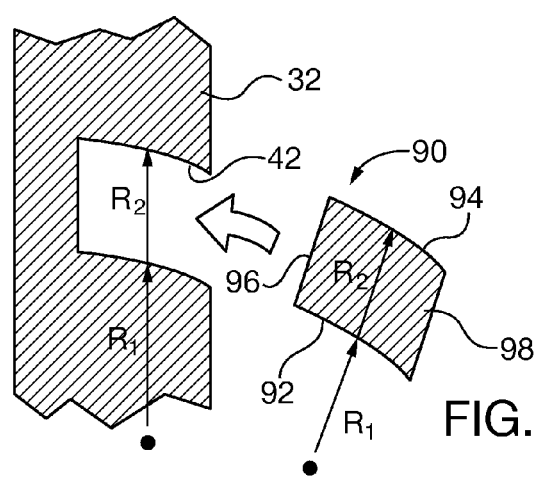
FIG. 19 is a cross-sectional elevational view of a repair splice prior to insertion into a blind excavation recess in accordance with another embodiment of the present invention.

FIGS. 15-18 show an excavation recess 40 and repair splice 80 that are suitable for side wall repair thin-walled hollow blade 30 castings. The recess 40 geometry is excavated for mechanical interlocking insertion of repair splice 80 from the hollow interior side 33 of blade side wall 32. As shown in FIGS. 16 and 17, the repair splice 80 is inserted sideways into the blade interior hollow portion through the recess 40, and subsequently rotated so that the respective interlocking triangular tabs 82 and slots 44 are in relative alignment. Next, referring to FIG. 18, the splice 80 is fully seated into the recess 40 and affixed to the blade body sidewall 32 with ductile braze bead 60. By constructing the repair splice 80 from the same material as the blade body side wall 32 and mechanically interlocking those components by snug mating fit, such a repair can be practiced on a blade side wall closer to the blade root without compromising the repaired blade's structural integrity, and does not impede blade dynamic rebalancing. Another blade side wall 32 repair embodiment is shown in FIG. 19, wherein the repair splice 90 has an arcuate, three-dimensional profile suitable for transferring radial stresses along the blade. Blind recess 42 has a curved profile with respective inner and outer radii $R_1$ and $R_2$ that mate with the repair splice 90 corresponding radii 92, 94, when the repair splice inner wall 96 is fully seated within the recess. The repair splice outer wall 98 can be affixed to the blade body 32 about the recess 42 periphery by cosmetic welding or brazing. Any excess material can be subsequently ground away to restore "as new" blade 30 dimensions and balance.

Figure 20A:
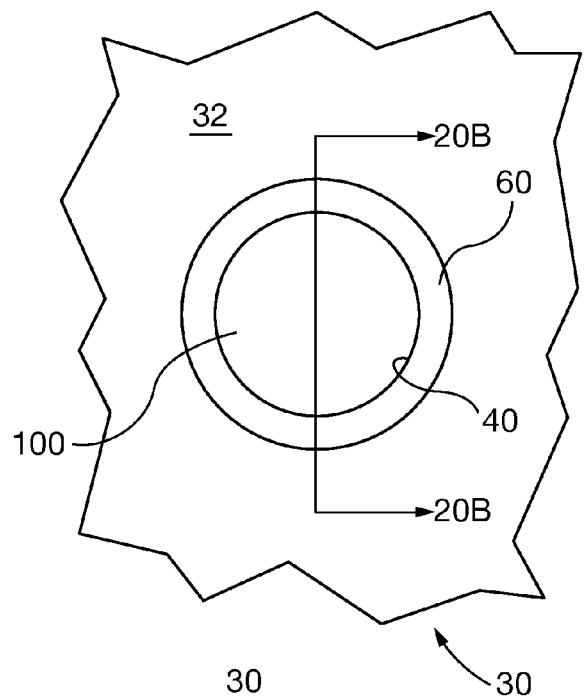
FIGS. 20A-C show a cylindrical-shaped repair splice and mating excavation recess in accordance with another embodiment of the present invention.
Figure 20B:
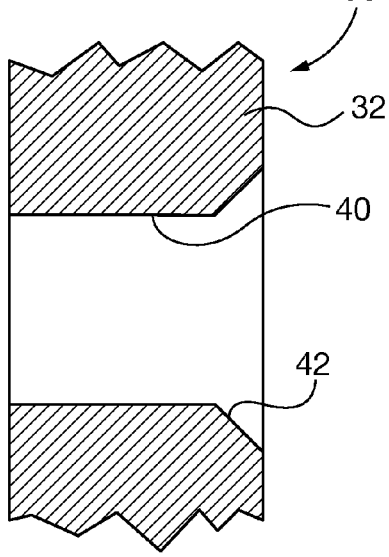
Figure 20C:
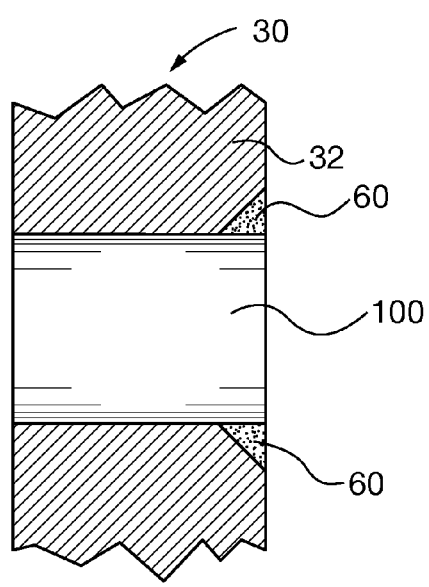

FIGS. 20A-20C show a blade sidewall 32 repaired with a cylindrical pin-shaped repair splice 100 that mates with a corresponding cylindrical profile excavated recess 40, with an optional chamfered entrance 42, for retention of a cosmetic braze bead 60. Asymmetrical pin profiles may be substituted for the cylindrical pin-shaped repair splice 100.

Figure 21:
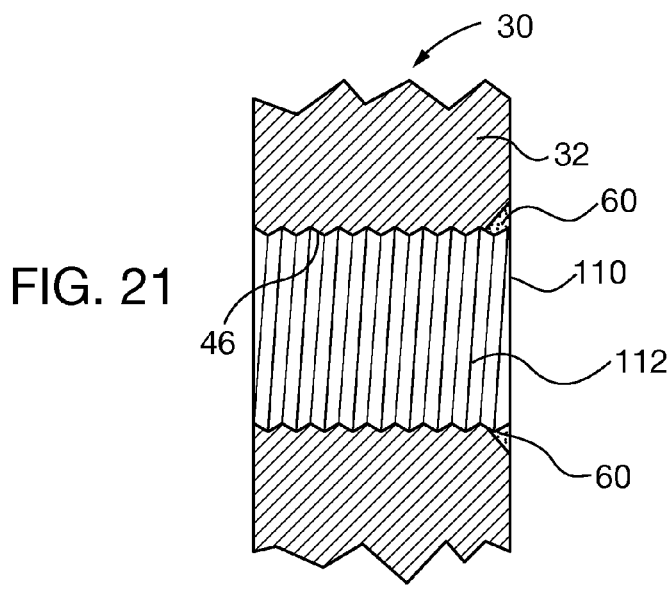
FIG. 21 shows a cross-sectional view of a threaded rod repair splice and mating excavation recess in accordance with another embodiment of the present invention.
Figure 22:
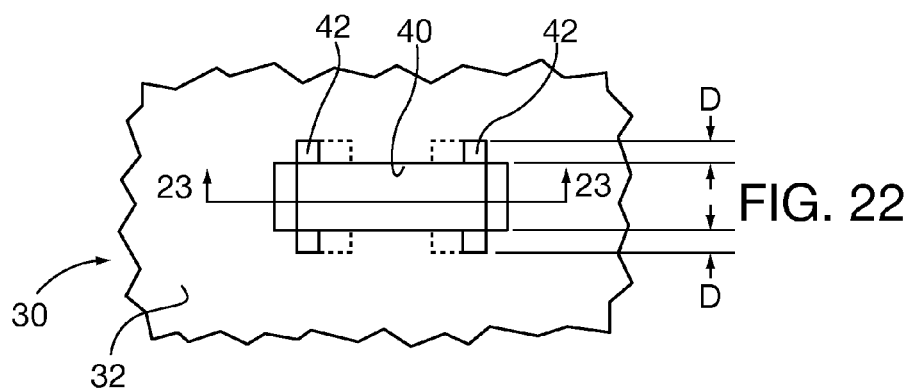
FIG. 22 shows a plan view of an excavation recess in accordance with another embodiment of the present invention receives a repair splice with integral locking projections.
Figure 23:
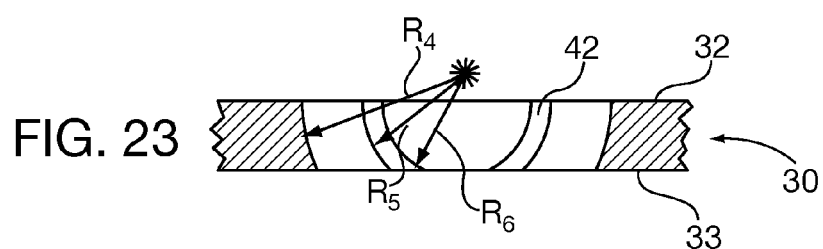
FIG. 23 is a partial cross sectional elevational view of the recess embodiment of FIG. 22.
Figure 24:
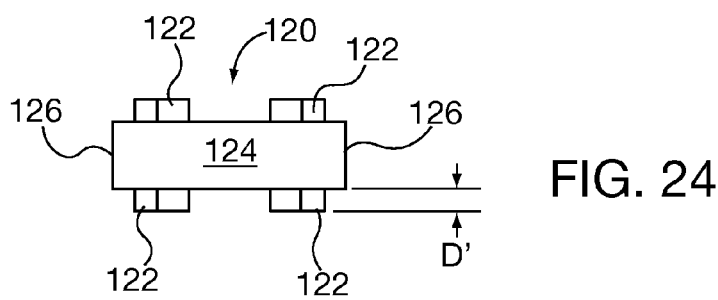
FIG. 24 is a plan view of a repair splice with integral locking projections that mates with the recess embodiment of FIGS. 22 and 23.

In the embodiment of FIG. 21, the repair splice 110 is a pin or threaded rod constructed of superalloy. Male threads 112 engage female threads 46 formed in the blade 30 by EDM or conventional drilling and tapping. A braze bead 60 is formed between the threaded rod 110 and the blade 30. Excess threaded rod 110 and braze bead 60 are removed to conform them to the blade 30's surrounding local profile.

In the embodiments shown in FIGS. 22-27, repair splice 120 may be constructed with externally projecting radiused lugs 122 that mate with radiused lug recesses 42 formed in the repaired turbine blade 30 or component substrate by rotational insertion of the splice into the recess (see FIG. 26). The lug 122 and slot 42 orientations may be reversed, with the insert including female slots that mate with male projections formed in the repaired component substrate. The excavated recess 40 has radiused outer edges of radius $R_4$ and radiused lug recesses defined by outer radius $R_5$ and inner radius $R_6$. The splice 120 has a top surface 124 and radiused outer edges of radius $R_4'$ that is less than or equal to radius $R_4$. Splice 120 also has projecting radiused lugs 122, with an outer radius $R_5'$ less than or equal to radius $R_5$ and an inner radius $R_6'$ that is greater than or equal to radius $R_6$. A braze or weld bead 60 is formed within part or all of the peripheral edge between the mated splice 122 and recess 40. Excess splice top surface 124 and braze bead 60 may be removed to conform their profiles to that of the locally surrounding blade 30.

Although various embodiments which incorporate the teachings of the present invention have been shown and described in detail herein, those skilled in the art can readily devise many other varied embodiments that still incorporate these teachings.

What is claimed is:

1. A repaired turbine blade comprising, a turbine blade body that defines a hollow portion and an excavated recess having a curved profile that facilitates repair splice insertion from inside the hollow portion toward an exterior surface of the blade body, the recess profile defined by a radius of curvature axis that is generally parallel to an adjoining hollow portion defined interior surface or exterior surface of the blade body and laterally offset therefrom; and
   a mating, mechanically interlocking repair splice inserted and captured within the recess, with the repair splice affixed to the blade body for retention thereof, having a repair splice outer profile conforming to the radiused curve recess profile.

2. The repaired turbine blade of claim 1, wherein the recess and repair splice have mating profiles that locally vary, and only allow unidirectional insertion and withdrawal of the repair splice.

3. The repaired turbine blade of claim 1, wherein the recess comprises at least one through-slot passing fully through the blade body.

4. The repaired turbine blade of claim 3, wherein the through-slot cross-sectional profile allows only unidirectional insertion and withdrawal of the mating repair splice.

5. The repaired turbine blade of claim 1, wherein the recess comprises a blind recess formed partially within the blade body thickness for engagement with a mating projecting portion formed in the repair splice.

6. The repaired turbine blade of claim 1, wherein the blade body and repair splice are constructed of a same material with substantially similar mechanical structural properties, affixed to each other with heat-applied alloys selected from the group consisting of brazing alloys and weld alloys that upon their application do not substantially change said structural properties.

7. The repaired turbine blade of claim 1, further comprising a radiused lug recess defined by the blade body and a mating radiused lug defined by the repair splice, with the repair splice into the blade body by rotational engagement and capture of the lug within the lug recess for retention thereof.

8. A method for repairing a turbine blade comprising:
   removing a damaged portion of an exposed surface of a body of a turbine blade and forming a curved profile excavated recess therein that is in communication with the exposed surface whose surface profile is defined by the blade body, the recess profile defined by a radius of curvature axis that is generally parallel to an adjoining portion of the blade body surface profile;
   forming a repair splice having a mating repair splice outer profile conforming to the corresponding recess profile;
   inserting and capturing the repair splice within the recess along a non-linear insertion path, so that the blade body and repair splice are mechanically interlocking after said non-linear insertion; and
   affixing the repair splice to the blade body in order to prevent their separation.

9. The method of claim 8, wherein the removing step is performed by electric discharge machining.

10. The method of claim 8, wherein the blade body and repair splice are constructed of a same material with substantially similar mechanical structural properties; and the affixing step is performed by heat application of alloys selected from the group consisting of brazing alloys and weld alloys that upon their application do not substantially change said structural properties.

11. The method of claim 8, wherein during the removing and forming steps the recess and repair splice mating profiles so formed only allow unidirectional insertion and withdrawal of the repair splice.

12. The method of claim 8, wherein during the removing step the recess so formed comprises at least one through-slot passing fully through the blade body.

13. The method of claim 12, wherein during the removing step the recess so formed comprises a through-slot whose cross-sectional profile allows only unidirectional insertion and withdrawal of the mating repair splice.

14. The method of claim 8, further comprising
   forming a radiused lug recess in the blade body or the repair splice and a mating radiused lug recess in the other of the blade body or the repair splice before said insertion; and said insertion and capture including rotational engagement and capture of the lug within the lug recess, so that the blade body and repair splice are mechanically interlocking after said rotational insertion.

15. A method for repairing a turbine blade comprising:

removing a damaged portion of a body of a turbine blade and forming a curved profile blind excavated recess partially within the blade body thickness, the recess profile defined by a radius of curvature axis that is generally parallel to an adjoining portion of a surface profile of the blade body and laterally offset therefrom;

forming a repair splice having a mating repair splice outer profile conforming to the corresponding recess profile;

inserting and capturing the repair splice within the recess, so that the blade body and repair splice are mechanically interlocking after said insertion; and affixing the repair splice to the blade body in order to prevent their separation.

16. A method for repairing a turbine blade comprising:

providing a turbine blade body that defines a hollow portion and removing a damaged portion thereof by forming an excavated recess therein whose profile is defined by the blade body, and that facilitates subsequent unidirectional repair splice insertion from inside the hollow portion toward an exterior surface of the blade, the recess profile defined by a radius of curvature axis that is generally parallel to an adjoining inside hollow portion defined interior surface or exterior surface of the blade body;

forming a repair splice having a mating repair splice outer profile corresponding to the radiused curve recess profile;

inserting and capturing the repair splice within the recess along a non-linear insertion path, so that the blade body and repair splice are mechanically interlocking after said insertion; and affixing the repair splice to the blade body in order to prevent their separation.

17. A repaired turbine blade comprising:

a blade body having an excavated recess; and a mating, mechanically interlocking repair splice inserted and captured within the recess, by a curved radiused lug recess defined by the blade body or the repair splice and a mating curved radiused lug defined by the other of the blade body or the repair splice;

with the repair splice affixed to the blade body after insertion and rotational engagement and capture of the lug within the lug recess along a non-linear insertion path, for retention thereof.

* * * * *